US012619091B2

(12) United States Patent     (10) Patent No.:    US 12,619,091 B2

Kumkar                                (45) Date of Patent:        May 5, 2026

(54) SUPERPOSITION DEVICE AND OPTICAL SYSTEM

(71) Applicant: TRUMPF Laser—und Systemtechnik GmbH, Ditzingen (DE)

(72) Inventor: Malte Kumkar, Weimar (DE)

(73) Assignee: TRUMPF LASER—UND SYSTEMTECHNIK GMBH, Ditzingen (DE)

( * ) Notice: Subject to any disclaimer, the term of this patent is extended or adjusted under 35 U.S.C. 154(b) by 313 days.

(21) Appl. No.: 18/489,885

(22) Filed: Oct. 19, 2023

(65)         Prior Publication Data

US 2024/0045223 A1     Feb. 8, 2024

Related U.S. Application Data

(63) Continuation of application No. PCT/EP2022/060657, filed on Apr. 22, 2022.

(30)      Foreign Application Priority Data

Apr. 23, 2021    (DE) .......................... 102021204057.8

(51) Int. Cl.
    *G02B 27/28*         (2006.01)
    *G02B 27/14*         (2006.01)

(52) U.S. Cl.
    CPC ......... *G02B 27/281* (2013.01); *G02B 27/144* (2013.01); *G02B 27/283* (2013.01); *G02B 27/286* (2013.01)

(58) Field of Classification Search
    CPC .. G02B 27/281; G02B 27/144; G02B 27/283; G02B 27/286
    See application file for complete search history.

(56)            References Cited

U.S. PATENT DOCUMENTS 7,817,688 B2    10/2010   Uberna
    8,248,700 B1    8/2012   Zorabedian
                 (Continued)

FOREIGN PATENT DOCUMENTS

DE      102017104392 A1    9/2018
    DE      102018211971 A1    1/2020
                 (Continued)

OTHER PUBLICATIONS

J. Zhang et al., "Eternal 5D data storage by ultrafast laser writing in glass," InLaser-based Micro- and Nanoprocessing X, Mar. 4, 2016, pp. 1-17, Proceedings of Spie, vol. 9736, Spie, Bellingham, Washington USA.

(Continued)

*Primary Examiner* — James A Dudek
(74) *Attorney, Agent, or Firm* — LEYDIG, VOIT & MAYER, LTD.

(57)           ABSTRACT

A superposition device includes four inputs, each respective input for entry of a respective one of four input beams, an output for exit of an output beam, a first combination device for coherent combination of a first input beam and a second input beam to form a first superposition beam, a second combination device for coherent combination of a third input beam and a fourth input beam to form a second superposition beam, and a third combination device for forming the output beam by coherent combination of the first superposition beam and the second superposition beam. The superposition device is configured to set both a polarization direction and a power of the output beam independently of one another based on relative phase positions of individual phases of the four input beams fed to the four inputs in relation to one another.

18 Claims, 3 Drawing Sheets

(56)  References Cited

U.S. PATENT DOCUMENTS

| | | | |
|---|---|---|---|
| 9,042,009 | B2 | 5/2015 | Papadopoulos et al. |
| 9,240,669 | B2 | 1/2016 | Papadopoulos et al. |
| 9,792,945 | B1 | 10/2017 | Ahner et al. |
| 10,181,336 | B1 | 1/2019 | Georgiou et al. |
| 10,201,874 | B2 | 2/2019 | Cheng et al. |
| 10,236,027 | B1 | 3/2019 | Georgiou et al. |
| 2007/0086010 | A1 | 4/2007 | Rothenberg |
| 2017/0219775 | A1 | 8/2017 | Chen |
| 2021/0119707 | A1 | 4/2021 | Dong |
| 2021/0165135 | A1 | 6/2021 | Tillkorn et al. |

FOREIGN PATENT DOCUMENTS

| | | | |
|---|---|---|---|
| WO | WO 2006104704 A1 | 10/2006 | |
| WO | WO 2016133707 A1 | 8/2016 | |
| WO | WO 2019220430 A2 | 11/2019 | |
| WO | WO 2022223761 A1 | 10/2022 | |

OTHER PUBLICATIONS

C. Pawong, et al., "Investigation of the use of rotating linearly polarized light for characterizing SiO2 thin-film on Si substrate," Optoelectronic Materials and Devices, VI, 2011, pp. 1-8, edited by Guang-Hua Duan, vol. 8308 of Proceedings of SPIE, paper 830811, Optica Publishing Group, Washington, D.C., United States.

Pawong C. et al, "The rotating linearly polarized light from a polarizing Mach-Zehnder interferometer: Production and applications," Optics & Laser Technology, 2011, pp. 461-468, vol. 43, Issue 3, Elsevier, Amsterdam, Netherlands.

Odier A., "Coherent combining of second-harmonic generators by active phase control of the fundamental waves," Optics Letters, 2017, pp. 3201-3204, vol. 42, Issue 16, Optica Publishing Group, Washington, D.C., United States.

Sakakura M. et al., "Ultralow-loss geometric phase and polarization shaping by ultrafast laser writing in silica glass," Light: Science & Applications, Feb. 4, 2020, pp. 1-10, 9(1), 15.

SUPERPOSITION DEVICE AND OPTICAL SYSTEM

CROSS REFERENCE TO RELATED APPLICATIONS

This application is a continuation of International Application No. PCT/EP2022/060657 (WO 2022/223761 A1), filed on Apr. 22, 2023, and claims benefit to German Patent Application No. DE 10 2021 204 057.8, filed on Apr. 23, 2021. The aforementioned applications are hereby incorporated by reference herein.

FIELD

Embodiments of the present invention relate to a superposition device for the coherent superposition of four mutually coherent input beams to form an output beam. Embodiments of the present invention also relate to an optical system, which comprises at least one such superposition device for the superposition of four mutually coherent input beams to form an output beam. The four mutually coherent input beams and the output beam formed when they are superposed are typically laser beams.

BACKGROUND

The superposition device described above is preferably designed to superpose the four input beams collinearly, it being possible in particular for a congruent superposition to take place to form the output beam. The coherent superposition of the four input beams makes it possible to modulate or manipulate the properties of the output beam, for example the power of the output beam and/or the polarization state of the output beam.

Rapid polarization modulation may generally be implemented using interferometric systems, into which a single input beam is input coupled and in the case of which the phase is manipulated by phase shifters integrated in the interferometer; cf. for example the article "The rotating linearly polarized light from a polarizing Mach-Zehnder interferometer: Production and applications", C. Pawong et al., Opt. Lasers Tec. 43, 461-468 (2011), or the article "Investigation of the use of rotating linearly polarized light for characterizing $SiO_2$ thin-film on Si substrate", C. Pawong et al., in: Optoelectronic Materials and Devices, G. Duan, ed., vol. 8308 of Proceedings of SPIE (2011), paper 830811.

The rapid polarization modulation may for example be used to write polarization-influencing nanostructures to transparent materials for data storage with a high storage density and an extremely long service life; see, for example, the article "Eternal 5D data storage by ultrafast laser writing in glass" by J. Zhang et al., Proc. of SPIE vol. 9736, 97360U (2016). A corresponding optical data storage system on the basis of nano-gratings which are written into a glass material and are formed when light of spatially modulated phase and polarization is radiated in is described in U.S. Pat. No. 10,236,027 B1. For the modulation of the phase and the polarization, that document makes use of a liquid-crystal spatial light modulator (SLM).

U.S. Pat. No. 10,181,336 B1 describes an optical data storage system which, for the data storage, comprises a dynamic digital hologram with independently programmable holographic zones. The dynamic digital hologram may be in the form of an optically actuable SLM.

In the case of the methods and apparatuses described above for writing nanostructures or voxels into a transparent material, the dynamics are limited owing to multiplexing and/or segmentation of multi-spot arrays in terms of their polarization state.

U.S. Pat. No. 9,792,945B1 describes a 3D optical data storage medium. The electrical property of a storage cell is modified using light energy. It is not mentioned how the setting of the light energy parameters, which is required for writing at a high data rate, can be realized, in particular also in terms of the polarization alignment.

It is likewise known to use coherent superposition or coupling for rapid modulation of the laser power; cf. for example the article "Coherent combining of second-harmonic generators by active phase control of the fundamental waves", A. Odier et al., Optics Letters 42 (16), 2017, 3201ff. In the article, use is made of active phase control at the fundamental wavelength in order to control the superposition at the frequency-converted wavelength.

DE 10 2017 104 392 A1 discloses the use of an interferometer as superposition device to modulate the amplitude of an output laser beam, in the case of which interferometer a relative phase position is temporally modulated by two beam channels of the interferometer. If polarization beam splitters are used as splitting element for splitting the input laser beam and as combination element for coherent combination, the modulation of the relative phase position leads to modulation of the polarization state of the coherently superposed output beam. Using a waveplate and a polarizer, it is possible in this case to convert the modulation of the polarization state of the output laser beam into modulation of the amplitude of the output laser beam.

U.S. Pat. No. 9,042,009 B2 describes a passive apparatus for coherent superposition, comprising an amplitude-splitting interferometer with at least four branches.

SUMMARY

Embodiments of the present invention provide a superposition device for the coherent superposition of four mutually coherent input beams to form an output beam. The superposition device includes four inputs, each respective input for entry of a respective one of the four input beams, an output for exit of the output beam, a first combination device for coherent combination of a first input beam and a second input beam of the four input beams to form a first superposition beam, a second combination device for coherent combination of a third input beam and a fourth input beam of the four input beams to form a second superposition beam, and a third combination device for forming the output beam by coherent combination of the first superposition beam and the second superposition beam. The superposition device is configured to set both a polarization direction and a power of the output beam independently of one another based on relative phase positions of individual phases of the four input beams fed to the four inputs in relation to one another.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figures 1A, 1B, 1C:
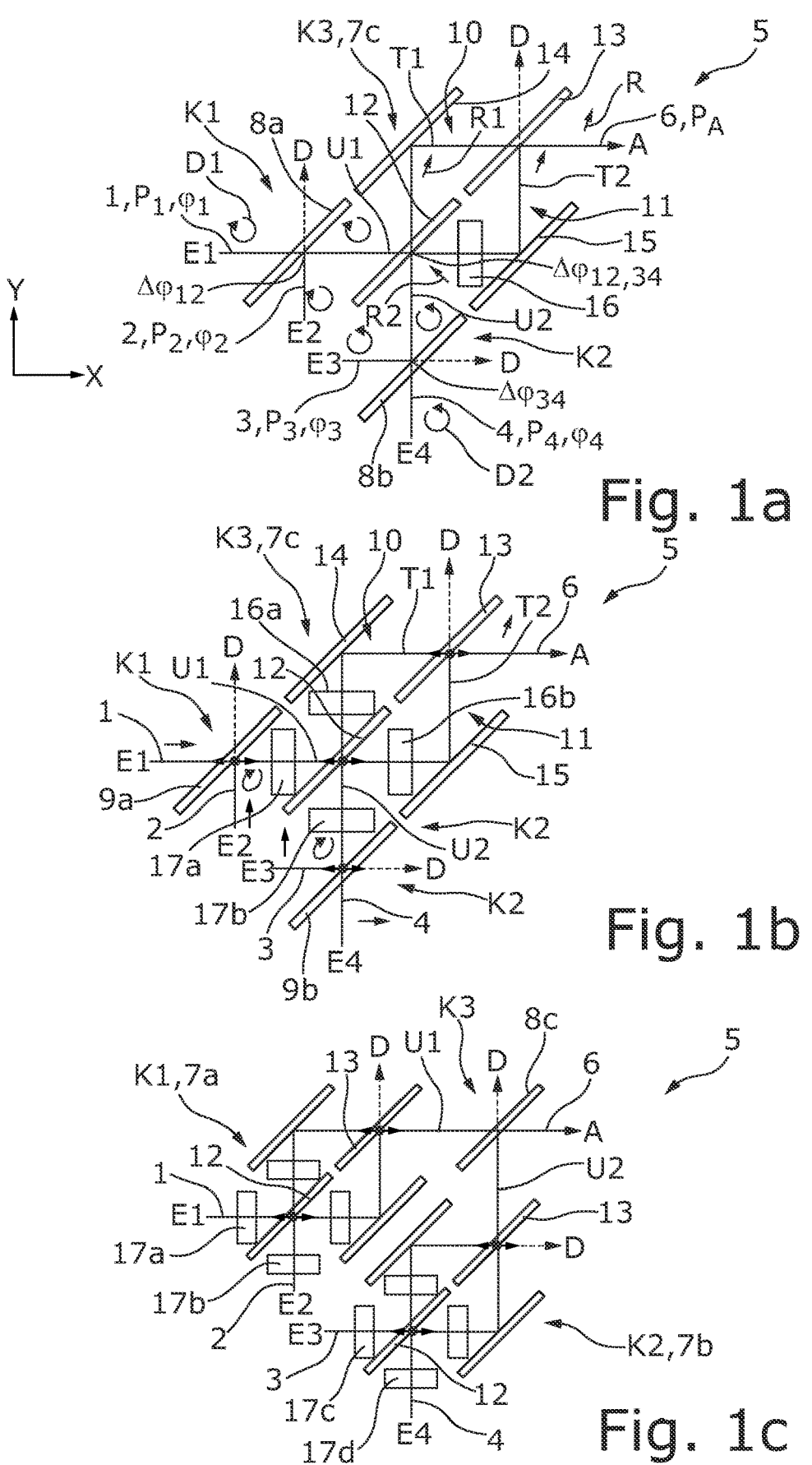
FIG. 1a, FIG. 1b and FIG. 1c show schematic illustrations of three exemplary embodiments of a superposition device which comprises three combination devices, one or two of which are in the form of a Mach-Zehnder interferometer, for the coherent superposition of four mutually coherent input beams.

Embodiments of the present invention provide a superposition device and an optical system comprising such a superposition device, which make it possible to independently set or modulate the power and the polarization state of the coherently superposed output laser beam.

According to embodiments of the invention, a superposition device includes: four inputs for the entry of a respective one of the input beams, an output for the exit of the output beam, a first combination device for the coherent combination of the first input beam and the second input beam to form a first superposition beam, a second combination device for the coherent combination of the third input beam and the fourth input beam to form a second superposition beam, and a third combination device for forming the output beam by coherent combination of the first superposition beam and the second superposition beam, the superposition device being designed to set both a polarization state, in particular a polarization direction, and a power of the output beam independently of one another on the basis of relative phase positions of the individual phases of the input beams fed to the four inputs in relation to one another.

In the case of the superposition device described here, there is a two-stage superposition of the four input beams, that is to say first of all two of the input beams are superposed to form one of two superposition beams in each case and then the two superposition beams are superposed to form the output beam. The three combination devices may be different optical assemblies, or separate optical components. However, it is also possible for one and the same optical element or component to perform the function of two or possibly all three combination devices. In this case, the respective beams are typically superposed at different positions of the optical element or component.

By contrast to DE 10 2017 104 392 A1, which was cited in the introduction, in the case of the two-stage superposition device described here the polarization state and the power of the output beam are set or modulated independently of one another. The setting of the polarization state of the output beam can in particular involve setting a linear polarization of the output beam, the polarization direction (azimuth angle) of which can be selected freely (from 0° to 180°).

The superposition device may be a passive device that has no optical elements whose optical properties can be set. In the event that the superposition device has optical elements whose optical properties can be set, for example phase shifters, optical rotators, etc., such setting is generally not used to dynamically set or modulate the polarization state and/or the power of the output beam, but rather typically only to correct unwanted, for example temperature-related, changes in the optical properties of the optical components of the superposition device, in order thereby for example to enable complete constructive interference of the input beams (see below).

The polarization state and/or the power of the output laser beam is typically set solely by setting or predefining the relative phase positions of the individual phases of the input beams in relation to one other. Since the absolute phase of the four input beams is not important for the superposition, a phase modulation unit designed to set or modulate the phases of three of the four input beams is sufficient to set the relative phase positions. The polarization state and/or the power of the output beam may be set in highly dynamic fashion, with switching durations for example in the MHz range, by predefining or setting the (relative) phase positions of the four input beams using the phase modulation unit.

The rapid switching in particular of the polarization makes it possible to effect a faster write rate without extended multiplexing in the event of use for writing polarization-influencing nanostructures into a transparent material or in the event of aligning dipole properties in a transparent material with ferroelectric properties. Moreover, it is possible to reduce the optical requirements and typically increase the efficiency over writing approaches that are based on segmentation, in polarization terms, of the regions that are to be written. It is also possible to achieve increased efficiency and increase the effective write rate while maintaining the same repetition frequency over the sequential writing of voxel arrays each having the same polarization, as described in U.S. Pat. No. 10,181,336 B1. In comparison with approaches that allow 2D multi-spot distribution with independent control of the power/phase and the polarization direction using an SLM, as is the case for example in U.S. Pat. No. 10,236,027 B1, the result is the aforementioned advantages, by virtue of a higher modulation rate, and the advantages mentioned below, that result from the modulation not taking place in the used, or output beam:

The arrangement of a phase modulation unit upstream of the superposition device means that it is not necessary for the phase modulation unit to provide the output beam with the required output parameters directly from an input beam. This makes it possible, for example, to use lower-performance components for the modulation of the relative phase positions. In addition, in the case of input beams that are generated by an ultrashort pulse laser, the power in the phase modulation unit may be reduced by switching temporally stretched pulses. Optical components having increased losses may also be used without having an excessively negative effect on the efficiency of the overall system. The relative phase positions of the input beams may additionally be modulated at a different wavelength than the wavelength of the output beam.

The superposition device is preferably designed to set a power of the output beam for at least one relative phase position of the individual phases of the four input beams, where the power—except for parasitic losses occurring upon passage through the optical components of the superposition device—corresponds to the sum of the powers of the four input beams. The superposition device thus makes it possible to generate complete constructive interference of the input beams at the output given an appropriate selection of the relative phase position of the input beams, with the result that the output beam has the maximum possible power (100% of the sum of the powers of the input beams). As described above, it is possible to set, in addition to the in this case maximum power of the output beam, the polarization state of the output beam independently of this. The superposition device is typically also designed to modulate the power independently of the polarization state, specifically up to complete destructive interference of the four input beams at the output, that is to say to a power of the output beam that is 0% of the sum of the powers of the four input beams.

The power of the input beams that enter the superposition device at the four inputs is typically substantially the same for all four input beams, that is to say the power of a respective input beam is not used to dynamically set the polarization state or the power of the output beam. In principle, however, it is possible to deviate (generally slightly) from an identical intensity of the four input beams in order to ensure the above-described complete constructive interference of the four input beams when they are superposed to form the output beam. This may be necessary for example if the losses of the input beams exhibit different magnitudes upon passage through the superposition device.

In addition to the output beam, generally at least one further beam, which can be used as diagnostic beam, is generated at a further ("inverting") output by the superposition device, more specifically by at least one combination device. The diagnostic beam typically has a polarization direction which is aligned perpendicularly to the polarization direction of the beam exiting the other output. It is also the case that the sum of the power exiting at the output and at the further output is constant and does not depend on the relative phase positions of the four input beams.

The diagnostic beam may therefore for example be used to ascertain and monitor the polarization state and the power of the output beam or a respective superposition beam. The actual value of the polarization state that is measured (indirectly) in this case and the actual value of the power of the output beam may be used to adjust or regulate the powers and the relative phase positions of the input beams in order to set the setpoint value for the polarization state or the power of the output beam. To that end, it is also possible to act on the one or more settable optical components of the superposition device that were described above, for example in the form of one or more phase shifters, optical rotators, etc. As described above, such regulation is typically performed on a slower timescale than the highly dynamic setting of the relative phase positions of the input beams.

In one embodiment, the first, the second and/or the third combination device comprise/comprises an interferometer, preferably a Mach-Zehnder interferometer, with a first beam channel for propagation of a first partial beam and a second beam channel for propagation of a second partial beam. In principle, all three combination devices may comprise an interferometer or be in the form of an interferometer. In one embodiment, only the third combination device comprises an interferometer or is in the form of an interferometer. In an alternative embodiment, both the first and the second combination device, but not the third combination device, comprise an interferometer or are in the form of an interferometer.

In a development, the interferometer of the first combination device comprises a splitting element for splitting the coherently superposed first and second input beams into the two partial beams and a combination element for the coherent superposition of the two partial beams to form the first superposition beam, and/or the interferometer of the second combination device comprises a splitting element for splitting the second and third coherently superposed input beams into the two partial beams and a combination element for the coherent superposition of the two partial beams to form the second superposition beam. As described above, in this development preferably both the first combination device and the second combination device comprise an interferometer, while the third combination device preferably does not comprise an interferometer. It should be understood that the splitting element is used not just for splitting the respective input beams into the two partial beams, but also for the coherent superposition thereof.

In a further embodiment, the interferometer of the third combination device comprises a splitting element for splitting the first and second coherently superposed superposition beams into the two partial beams, and a combination element for the coherent superposition of the two partial beams to form the output beam. As described above, in this case the first and the second combination device are preferably not in the form of an interferometer.

It is possible to use an interferometer, in particular a Mach-Zehnder interferometer, both to reduce the power of the output beam via reduced constructive interference and to set the polarization state or the polarization direction of the output beam by controlled adjustment of the phases of the individual input beams in relation to one another. It should be understood that such an interferometer can also be used to set only the power or only the polarization state of the output beam. The interferometer generally has at least one optical component or a combination of optical components for phase and/or polarization adjustment between the two partial beams or between the two beam channels in order to ensure that, when the relative phase position of the two partial beams in relation to one another is selected appropriately, maximum constructive interference occurs at the combination element at which the coherent superposition of the two partial beams takes place. The combination element of the interferometer usually generates a diagnostic beam upon coherent superposition of the two partial beams and the diagnostic beam can be used, for example, to determine the powers and the relative phase positions of the two partial beams and the phase shift between the two beam channels of the interferometer and possibly to adjust them in the manner described above.

In a further development, the interferometer has at least one polarization-influencing device for influencing a polarization state, in particular a polarization direction, of at least one of the partial beams, preferably in fixedly predefined fashion. As described above, a suitable polarization-influencing device makes it possible to influence the polarization state of one or both partial beams such that maximum constructive interference occurs at the combination element in at least one phase position of the two partial beams relative to one another. Influencing the polarization state in fixedly predefined fashion is understood to mean that there is no dynamic influencing of the polarization state, since the polarization state and/or the power of the output beam is set dynamically solely through the setting of the relative phase positions of the input beams. However, the polarization-influencing device may in principle be designed as controllable, in order to compensate for different parasitic losses in the two beam channels, thermal effects, etc., as described above.

The one or more polarization-influencing devices are preferably in the form of polarization-rotating optical devices or elements (polarization rotators), in particular in the form of optical rotators, for example in the form of optical crystals, which, on account of their crystalline structure, have an intrinsic polarization rotation when aligned appropriately, for example crystalline quartz, which exhibits high transparency and performance in a wide wavelength range from UV to NIR. In principle, Faraday rotators may also be used as polarization-influencing device. However, Faraday rotators require an external magnetic field for polarization rotation, and are therefore more complex to manufacture and operate than optical crystals. For the present application, it is expedient for a polarization rotation of the one or more partial beams to take place independently of the polarization direction of the respective partial beam. Such a polarization rotation is typically not possible with birefringent retardation devices, for example with $\lambda/2$ retardation elements, since these allow rotation of the polarization direction only in the event of a prescribed polarization direction of the respective partial beam.

In one embodiment, the splitting element and the combination element are in the form of intensity beam splitters, and the interferometer has, as polarization-influencing device, at least one polarization-rotating optical device, in particular an optical rotator, for aligning the polarization directions of the two partial beams perpendicularly relative to one another. Within the meaning of this application, an intensity beam splitter is understood to mean a beam splitter that allows two or more partial beams to be split or combined substantially independently of their polarization state. The intensity beam splitters described here are generally in the form of 50% beam splitters, that is to say they combine two beams entering the intensity beam splitter with the same weighting to form an exiting beam. The intensity beam splitter may be for example in the form of a dielectric layer system on the surface of a transparent substrate. With a suitable alignment of the surface with respect to the beam incidence direction, it is possible to achieve the desired polarization-independent reflectance and transmittance of essentially 50% in each case.

In the simplest case, to align the polarization directions of the two partial beams, an optical rotator may be arranged in one of the two beam channels of the interferometer, the optical rotator causing the polarization direction of the partial beam propagating in this beam channel to rotate by 90°. However, it goes without saying that two or, where applicable, more than two polarization-rotating optical devices or elements may also be arranged in the beam channels of the interferometer in order to align the polarization directions of the two partial beams at an angle of 90° relative to one another.

In a development of this embodiment, the superposition device, or the optical system in which the superposition device is integrated, is designed to feed the first and the second input beam, the third and the fourth input beam or the first and the second superposition beam with circular polarization and respective opposite directions of rotation to the splitting element of the interferometer. In the three cases mentioned, the first, the second and the third combination device, respectively, comprises the interferometer. In the event that the interferometer is integrated in the third combination device, the setting of the relative phase position of the first and the second input beam in the first combination device and the relative phase position of the third and the fourth input beam in the second combination device makes it possible to set the power of the first and the second superposition beam. To set the power of the respective superposition beam, the first and/or the second combination device may for example comprise an intensity beam splitter. The first input beam and the second input beam are typically circularly polarized in this case and have the same direction of rotation. Accordingly, the third and the fourth input beam are also circularly polarized and have an opposite direction of rotation to the first and the second input beam. In this way, the power of the two superposition beams can be set independently of one another.

If the output beam is to have maximum power, it is desired for the first and the second input beam in the first combination device to have maximum constructive interference to form the first superposition beam and for the third and the fourth input beam in the second combination device to have maximum constructive interference to form the second superposition beam. This may be the case, for example, if the first and the second input beam have a relative phase position of 0° in relation to one another or—depending on the output of the intensity beam splitter from which the superposition beam exits—if the first and the second input beam have a phase position of 90° in relation to one another. If the relative phase position of the input beams entering the superposition device changes before they are superposed to form the respective superposition beam, for example when a phase discontinuity occurs in the event of reflection, the phase position of the input beams should be correspondingly adjusted in order for the relative phase position in the superposition beam to correspond to 0°. The same applies to the third and the fourth input beam and the second combination device.

Setting the relative phase position of the first superposition beam and the second superposition beam relative to one another makes it possible to predefine the polarization direction of the linearly polarized partial beams in the two beam channels of the interferometer. The polarization directions of the two partial beams, which are linearly polarized after coherent superposition at the splitting element of the interferometer, are aligned perpendicularly in relation to one another. The polarization-rotating device or the polarization-rotating element that rotates the polarization direction of the two partial beams by 90° relative to one another, is used to bring about an identical alignment of the polarization directions of the two superposition beams at the combination element of the interferometer. In the event that the two superposition beams have the same power, at the output of the superposition device there is generated an output beam which is linearly polarized and has a polarization direction that can be set by predefining the relative phase position between the first and the second superposition beam. In the event that the two superposition beams have maximum power, upon superposition at the combination element of the interferometer an output beam of maximum power corresponding to the sum of the powers of the input beams is generated. Ideally, there is always full constructive interference upon superposition at the output of the interferometer.

In an alternative embodiment, the splitting element and the combination element are in the form of polarization beam splitters, and the interferometer has, as polarization-influencing device, two polarization-rotating optical devices, in particular two optical rotators, for rotating a polarization direction of a respective one of the two partial beams by 45°. By contrast to the embodiment described above, in which it does not matter how the rotation of the polarization direction of the two partial beams by 90° relative to one another is split over the two beam channels, if use is made of polarization beam splitters it is expedient for the rotation of the polarization direction in both beam channels to be symmetrical, that is to say for both partial beams to be rotated by 45°.

In this embodiment, the two partial beams propagating in the two beam channels of the interferometer are typically elliptically polarized partial beams. Rotation of the phase position of the two partial beams by 45° makes it possible to generate a linearly polarized output beam, with it being possible to achieve superposition to form an output beam with maximum constructive interference when the relative phase position is appropriately selected. In the case of the use of polarization beam splitters described here, owing to the lower degree of symmetry compared to intensity beam splitters, it is needed to make the process more complex in order to ensure maximum constructive interference. In the embodiment described here, the two optical rotators described above are needed for this.

In a development of this embodiment, the superposition device also comprises at least two polarization-influencing, in particular polarization-rotating, optical elements, in particular in the form of optical rotators, which are arranged upstream of the splitting element of the interferometer in the beam path and are preferably designed to rotate a polarization direction of the first and the second input beam, of the third and the fourth input beam, or of the first and the second superposition beam by 45°. In the event that the third superposition device comprises the interferometer, a respective polarization-rotating optical element may be arranged upstream of the splitting element of the interferometer in the beam path of the first and the second superposition beam.

In the event that the interferometer is integrated in the first combination device or in the second combination device, a respective polarization-rotating element may be arranged in the beam path of the first and the second input beam and in the beam path of the third and the fourth input beam, before these beams are superposed to form the first and the second superposition beam, respectively. Given an appropriate alignment of the preferred axis (axes) of the polarization beam splitters of the interferometer and of the polarization beam splitters of the other combination devices (at 45° in relation to one another), the further polarization-rotating optical devices can be omitted.

In the embodiment described here, in which the splitting element and the combination element are in the form of polarization beam splitters, the first and the second input beam are typically linearly polarized and their polarization directions are rotated by 90° in relation to one another. Accordingly, the third and the fourth input beam are linearly polarized and their polarization directions are rotated by 90° in relation to one another. When setting the relative phase position of the first and the second input beam and the relative phase position of the third and the fourth input beam, typically an elliptically polarized superposition beam is generated. Setting the phase position of the first and the second input beam relative to one another, the phase position of the third and the fourth input beam relative to one another and the phase position of the two superposition beams relative to one another, in combination with rotation of the polarization direction of the elliptical polarization upstream of or in the interferometer or interferometers also makes it possible in this case to set the power and the polarization state of the output beam independently of one another.

In a further embodiment, the first combination device for the coherent combination of the first input beam and the second input beam, the second combination device for the coherent combination of the third input beam and the fourth input beam, and/or the third combination device for the coherent combination of the first superposition beam and the second superposition beam have/has an intensity beam splitter or a polarization beam splitter. In this embodiment, the respective combination device typically does not comprise an interferometer or is not in the form of an interferometer. The respective combination device generally has exactly one polarization beam splitter or exactly one intensity beam splitter for the coherent combination of the first and the second input beam, of the third and the fourth input beam, and of the first and the second superposition beam.

In the event that the superposition device does not comprise an interferometer, it is usually desired for both the first and the second combination device to comprise a polarization beam splitter or for the third combination device to comprise a polarization beam splitter. It should be understood that it is also possible for all three combination devices to comprise a respective polarization beam splitter. If the beam exiting the respective combination device is to have a linear polarization, a phase shifting device in the form of a $\lambda/4$ retardation device, which is arranged downstream of the polarization beam splitter in the beam path, is usually needed (see below).

In a development of this embodiment, the superposition device, or the optical system in which it is integrated, is designed to feed the first and the second input beam, the third and the fourth input beam or the first and the second superposition beam with a respective identical polarization state, in particular with an identical polarization direction, to the intensity beam splitter. Upon coherent combination, in this case the power of the beam exiting the intensity beam splitter can be set by setting the relative phase position of the beams entering the intensity beam splitter. The (linear) polarization state, in particular the polarization direction, of the beams entering the intensity beam splitter remains the same here. Setting the relative phase position makes it possible to generate generally both maximum constructive interference and maximum destructive interference in relation to the respective superposition beam or output beam upon coherent combination in the intensity beam splitter.

In a further embodiment, the superposition device, or the optical system in which it is integrated, is designed to feed a first and a second input beam, a third and a fourth input beam or a first and a second superposition beam, in each case having two mutually perpendicular polarization directions, to the polarization beam splitter. The one or more polarizer axes are in this case typically aligned parallel to the two mutually perpendicular polarization directions. Upon coherent combination of the beams entering the polarization beam splitter, in the general case an elliptically polarized exiting beam is formed in which the half-axes (preferred axes or directions) of the elliptical polarization are aligned at 45° in relation to the two mutually perpendicular polarization directions of the entering beams. By aligning the preferred axis of a $\lambda/4$ retardation device to match the 45° preferred direction, the elliptical polarization is converted into a linear polarization, the polarization direction of which is determined by the principal axis ratio and the direction of rotation of the elliptical polarization. Setting the relative phase position between the beams entering the polarization beam splitter changes the aspect ratio between the half-axes of the elliptical polarization, but does not change the alignment of the half-axes at 45° in relation to the two mutually perpendicular polarization directions. The polarization components of the beams entering the polarization beam splitter that are not aligned parallel to a respective polarizer axis do not contribute to the power of the exiting beam. The alignment of the polarization direction of the beams entering the polarization beam splitter can therefore set the power of the exiting beam.

In a development, the first combination device is designed to set a polarization state, in particular to rotate a polarization direction, of the first superposition beam on the basis of a relative phase position between the first, preferably linearly polarized input beam and the second, preferably linearly polarized input beam, and/or the second combination device is designed to set a polarization state, in particular to rotate a polarization direction, of the second superposition beam on the basis of a relative phase position between the third, preferably linearly polarized input beam and the fourth, preferably linearly polarized input beam, and/or the third combination device is designed to set a polarization state of the output laser beam, in particular to rotate a polarization direction of the output laser beam, on the basis of a relative phase position between the first superposition beam and the second superposition beam. In the development described here, the first, the second and/or the third combination device for coherent combination comprise an intensity beam splitter or a polarization beam splitter. The use of suitable optical elements makes it possible in this case to set the polarization state, in particular to rotate the polarization direction of a respective superposition beam or of the output beam.

In a further development, the first, the second and/or the third combination device, in order to generate a linear polarization of the first superposition beam, of the second superposition beam and/or of the output beam, has a phase shifting element, in particular a λ/4 retardation device, which is arranged downstream of the intensity beam splitter or the polarization beam splitter in the beam path. The λ/4 retardation device may for example be a λ/4 retardation plate, although the λ/4 retardation device may also be designed in another way, for example in the form of an integrated, for example fiber-optic component. The λ/4 retardation device may also comprise multiple optical components in order to generate the phase shifting action. The optical axis or the preferred direction of the λ/4 retardation device is typically parallel to one of the half-axes, for example the long half-axis, of the generally elliptical polarization with which a respective beam enters the λ/4 retardation device. This ensures that the λ/4 retardation device generates a linear polarization of the respective exiting beam. In the event that the λ/4 retardation device is arranged downstream of a polarization beam splitter in the beam path, the optical axis or the preferred direction of the λ/4 retardation device is typically aligned at an angle of 45° in relation to the polarizer axis.

Appropriate selection of the polarization state or the polarization directions of the first and the second input beam, the third and the fourth input beam and/or the first and the second superposition beam makes it possible to ensure that the alignment of the principal axes of the elliptical polarization state of the beam entering the λ/4 retardation device is always aligned at 45° in relation to the optical axis of the λ/4 retardation device. As described above in conjunction with the polarization beam splitter, setting the relative phase position of the first and the second input beam, the second and the third input beam, or the first and the second superposition beam relative to one another makes it possible to set the aspect ratio of the elliptical polarization state, this causing rotation of the polarization direction of the beam exiting the λ/4 retardation device.

In another embodiment, the four inputs are designed for the entry of at least four further input beams and the output is designed for the exit of at least one further output beam which is a coherent combination of the four further input beams. In principle, it is possible to generate a number of N output beams from a number of 4N input beams by coherent superposition using the superposition device. In this respect, it is possible to feed multiple groups, each of four input beams, to a respective first, second and third combination device, the relative phase position of each being set in relation to and independently of one another, with the result that the power and the polarization state can be set independently of one another for each output beam. In the simplest case, the groups, each of four input beams, are fed to the optical elements of the first, the second and the third combination device with a lateral offset, with the result that the input beams and also the superposition beams, formed therefrom, of all the groups each pass through one and the same optical elements.

A further aspect of the invention relates to an optical system comprising: a beam source for generating a laser beam, a splitting device for splitting the laser beam into the four mutually coherent input beams, a phase modulation device for modulating the relative phase positions of the four input beams, and a superposition device, which is designed as described above, for the coherent superposition of the four input beams to form the output beam. The optical system and also the superposition device may be implemented with discrete optical components, using fiber-optics, using integrated optics or else in the form of a hybrid system.

The beam source is preferably a seed laser of a MOPA (Master Oscillator Power Amplifier) system. In this case, the four input beams are generated by amplifying the seed laser beam. It is possible in principle to arrange the phase modulation device directly upstream of the inputs of the superposition device in the beam path. If a MOPA system is involved, however, it is expedient for the relative phase positions of the four input beams to be set using a phase modulation device that is arranged upstream of the power amplifier of the MOPA system. It is thereby possible, in the phase modulation device, to use optical elements that require neither high performance nor high efficiency. The average power and/or peak power of the output beam may be high in such a MOPA system, and may be for example more than 1 W, 10 W, 1 kW, 10 kW or even 1 MW.

The output beam is typically fed to an application device of the optical system, which is generally a processing device for processing purposes, for example a processing head, for processing a workpiece by means of the output beam. Translational movement units for moving the processing head and/or the workpiece may also be provided in order to position the one or more output beams (see below) relative to the workpiece. Dynamic beam positioning (2 D, 2.5 D), spatio-temporal beamforming, position detection (prior to the process) and process control (in-situ, ex-situ) may also be performed.

When the output beam is fed to the workpiece, there may also be an influence of the polarization in the application device. By way of example, the application device, in order to feed the output beam to the workpiece, may have a birefringent component, for example an optical fiber, in particular a fiber-based amplifier. In this case, the superposition device may perform preliminary compensation of the birefringence generated when the output beam is fed to the workpiece. Typically, the preliminary compensation is performed by appropriately adjusting the relative phase positions that are set by the phase modulation device, so as to achieve the desired combination of polarization state and power of the output beam at the workpiece. It is thereby possible to use non-polarization-preserving transport fibers as well or to modify the MOPA concept by virtue of the superposition taking place upstream of the (typically fiber-based) power amplifier, which in this case is integrated in the application device.

In addition to the above-described use of the optical system for voxel writing for data storage in transparent materials, the optical system may also be used, among other things, for the production of optical components based on spatially dependent polarization manipulation. The rapid polarization change generated by the optical system may also be used advantageously for other applications, for example for analytical methods.

The optical system may also have a conversion device that is arranged between the phase modulation device and the superposition device. The conversion device may be an optical amplifier device, for example the one or more power amplifiers of the MOPA system described above. The conversion device may also perform another function.

The conversion device may for example be designed for frequency conversion of the input beams. This is expedient because wavelengths for which no high-performance amplifier system, no high-performance phase modulation device or other optical components are available are often of interest for the output beam or for the application for which the output beam is used. In this case, the coherent coupling in the superposition device may be combined with a frequency conversion that generally takes place upstream of the superposition device in the beam path. The optical system described here, in particular in the form of a MOPA system, is compatible with a frequency conversion device arranged between the beam source and the superposition arrangement.

The beam source for generating the laser beam may be designed to generate a cw laser beam and/or a pulsed laser beam. The beam source may in particular be designed to generate an ultrashort pulse laser beam containing laser pulses whose pulse durations are of the order of ps or fs. In the case of ultrashort pulse lasers, use is often made of what is known as chirped pulse amplification (CPA), in which temporally stretched pulses are amplified and then compressed. CPA technology may be combined with the coherent coupling of the four input beams to form the output beam, as described here, and in particular with the independent setting of the polarization state and the power of the output beam. In this case, the conversion device may for example form a pulse compressor of the CPA system. The conversion device may however also generally be designed for pulse shaping of the input beams, which are pulsed in this case.

It goes without saying that the conversion device may also be designed to perform several of the functions described above or that the optical system may have multiple conversion devices.

An appropriate beam guide, which may for example comprise a scanner optical unit, may be provided in the beam path between the beam source and the superposition device, in particular in the beam path between the conversion device and the superposition device, and downstream of the superposition device in the beam path of the output beam.

In a further embodiment, the splitting device is designed to split the laser beam or a further laser beam generated by the beam source into at least four further mutually coherent input beams, the phase modulation unit is designed to modulate the relative phase positions of the at least four further input beams, and the superposition device is designed for the coherent superposition of the at least four further input beams to form at least one further output beam.

In this embodiment, the optical system is designed to form a respective output beam from multiple groups, each of four input beams, by coherent superposition. The coherent superposition makes it possible to set the power and the polarization state independently of one another for each output beam, that is to say the powers and the polarization states of the output beams can be modulated independently of one another. However, it is also possible for multiple output beams to be generated in the optical system, the powers and the polarization states of which cannot be modulated independently of one another. Simultaneous redistribution among various output beams or the scanning of output beams based on expanded coherent coupling, and also 2D or 3D multiplexing, is also possible.

It goes without saying that the optical system may additionally be designed to generate at least one output beam which is not generated by coherent superposition of input beams and the power and/or the polarization state of which cannot be set. The use of such an output beam may be advantageous for certain applications.

In one embodiment, the optical system is designed to feed the four input beams and/or the at least four further input beams to the four inputs of the superposition device with substantially the same power. As described above in conjunction with the superposition device, it is expedient for the coherent superposition if the four mutually coherent input beams have substantially the same power or intensity. This may be achieved for example when the power of a laser beam that is generated by the beam source is split in equal parts into the four mutually coherent input beams in the splitting device. As described above, it is possible to deviate from an identical power of the four input beams if they experience different losses upon passage through the superposition device. The power of the individual input beams may be adjusted in order to compensate for the different losses upon passage through the superposition device. In this way, it is possible to have the effect that the power that can be coupled out of the input beams into the respective superposition beam and the power that can be coupled out of the superposition beams into the output beam match, with the result that an ideally complete interference contrast can be obtained in the superposition beams and in the output beam, respectively.

In a further embodiment, the optical system is designed to feed the four input beams and/or the four further input beams to the four inputs of the superposition device with linear polarization having a predefined polarization direction or with circular polarization. As described above in conjunction with the superposition device, it is expedient if the input beams are fed to the superposition device with a defined polarization state.

Further advantages of the invention will emerge from the description and the drawing. Likewise, the features mentioned above and those that are yet to be presented may be used in each case by themselves or as a plurality in any desired combinations. The embodiments shown and described should not be understood as an exhaustive enumeration, but rather are of an exemplary character for outlining the invention.

In the following description of the drawings, identical reference signs are used for components that are the same or have the same function.

FIGS. 1a-c each show a superposition device 5 for the coherent superposition of four mutually coherent input beams 1 to 4 to form a superposed output beam 6. The superposition device 5 has four inputs E1 to E4, which allow a respective one of the four input beams 1 to 4 to enter. The superposition device 5 also has an output A, which allows the output beam 6 formed during the coherent superposition to exit. The superposition device 5 is designed to superpose the four input beams 1 to 4 collinearly, the example shown involving congruent superposition to form the output beam 6.

The superposition devices 5 shown in FIGS. 1a-c and also the superposition devices described below share the feature that they make it possible to set a power $P_A$ and a polarization state of the output beam 6 independently of one another. In the examples shown, the polarization state that is set using the superposition device 5 is a polarization direction R of a linearly polarized output beam 6.

While the beam curves in FIGS. 1a-c and in the following figures are illustrated in the plane of the drawing, the polarization states are illustrated in a propagation direction perpendicular to the plane of the drawing. The X direction of the polarization states shown in FIGS. 1a-c corresponds to the s component in this respect, and the Y direction corresponds to the p component of the polarization.

The superposition devices 5 shown in FIGS. 1a-c and the superposition devices 5 described below make it possible to set a power $P_A$ of the output beam 6, where the power—except for parasitic losses occurring upon passage through the optical elements of the superposition device 5—corresponds to the sum of the powers $P_1$ to $P_4$ of the four input beams 1 to 4. In principle, the power $P_A$ of the output beam 6 may be set continuously between a value corresponding to the sum of the powers $P_1$ to $P_4$ of the input beams 1 to 4, that is to say 100% of the input power, and a value of 0% of the input powers $P_1$ to $P_4$ of the input beams 1 to 4.

The independent setting of the power $P_A$ and of the polarization direction R of the output beam 6 is enabled by the setting of relative phase positions $\Delta\varphi_{1,2}$; $\Delta\varphi_{3,4}$; $\Delta\varphi_{12,34}$ of the phases $\varphi_1$, $\varphi_2$, $\varphi_3$, $\varphi_4$, illustrated in FIGS. 1a-c, of the four input beams 1 to 4. The power $P_A$ and the polarization direction R of the output beam 6 are independently set typically exclusively by setting the relative phase positions $\Delta\varphi_{1,2}$; $\Delta\varphi_{3,4}$; $\Delta\varphi_{12,34}$ of the four input beams 1 to 4, that is to say without making use of other parameters of the four input beams 1 to 4 or parameters of optical components of the superposition device 5 to this end. The powers $P_1$ to $P_4$ of the four input beams 1 to 4 are generally to be the same, or they are selected to be different in order to perform preliminary compensation of parasitic losses. The powers $P_1$ to $P_4$ of the four input beams 1 to 4 are likewise not changed for the setting. Since the relative phase positions $\Delta\varphi_{1,2}$; $\Delta\varphi_{3,4}$; $\Delta\varphi_{12,34}$ of the four input beams 1 to 4 can be set in highly dynamic fashion, the power $P_A$ and the polarization direction R of the output beam 6 can also be set in highly dynamic fashion using the superposition device 5.

The superposition devices 5 shown in FIGS. 1a-c and those described below have the shared feature that they are designed to carry out two-stage coherent superposition using three combination devices K1 to K3: A first combination device K1 is used for the coherent combination of the first input beam 1 and the second input beam 2 to form a first superposition beam U1. A second combination device K2 is used for the coherent combination of the third input beam 3 and the fourth input beam 4 to form a second superposition beam U2. A third combination device K3 is used for forming the output beam 6 by coherent superposition of the first superposition beam U1 and the second superposition beam U2.

The properties of the first superposition beam U1, which is formed upon coherent combination or superposition of the first and the second input beam 1, 2 in the first combination device K1, depend on the relative phase position $\Delta\varphi_{12}$ of the first and the second input beam 1, 2, which corresponds to the phase difference $\Delta\varphi_{12}=\varphi_1-\varphi_2$ between the phase $\varphi_1$ of the first input beam 1 and the phase $\varphi_2$ of the second input beam 2. Accordingly, the properties of the second superposition beam U2, which is formed upon coherent combination or superposition of the third and the fourth input beam 3, 4 in the second combination device K2, depend on the relative phase position $\Delta\varphi_{34}$ of the third and the fourth input beam 3, 4, which corresponds to the phase difference $\Delta\varphi_{34}=\varphi_3-\varphi_4$ between the phase φ3 of the third input beam 3 and the phase φ4 of the fourth input beam 4.

The properties of the output beam 6 depend on the properties of the first superposition beam U1, the properties of the second superposition beam U2, and the relative phase difference $\Delta\varphi_{12,34}$ between the first and the second input beam 1, 2 and the third and the fourth input beam 3, 4. Since an absolute phase of the four input beams 1 to 4 when the relative phase positions $\Delta\varphi_{12}$; $\Delta\varphi_{34}$; $\Delta\varphi_{12,34}$ are being formed is not important, it is possible to define the relative phase difference $\Delta\varphi_{12,34}$ for example as the phase difference $\Delta\varphi_{12,34}=(\varphi_1+\varphi_2)/2-(\varphi_3+\varphi_4)/2$ between the first input beam 1 and the third input beam 3. The parameters set in order to independently set the power $P_A$ and the polarization direction R upon coherent superposition are therefore the three relative phase positions $\Delta\varphi_{12}$; $\Delta\varphi_{34}$; $\Delta\varphi_{12,34}$ described here of the four input beams 1 to 4.

The superposition devices 5 shown in FIGS. 1a-c each have at least one combination device K1, K2, K3, which forms a Mach-Zehnder interferometer 7a-c. In the case of the superposition device 5 shown in FIG. 1a,b, the third combination device K3 is in the form of a Mach-Zehnder interferometer 7c, and in the example shown in FIG. 1c the first and the second combination device K1, K2 are in the form of a Mach-Zehnder interferometer 7a,b.

The superposition device 5 shown in FIG. 1a has a first combination device K1 which has an intensity beam splitter 8a for the coherent superposition of the first and the second input beam 1, 2 to form the first superposition beam U1. Accordingly, the second combination device K2 of the superposition device 5 also has an intensity beam splitter 8b for the coherent superposition of the second and the third input beam 3, 4 to form the second superposition beam U2.

As described above, the third combination device K3 is in the form of a Mach-Zehnder interferometer 7c and has a first beam channel 10 and a second beam channel 11. The Mach-Zehnder interferometer 7c also comprises a splitting element 12 for the coherent superposition and splitting of the two superposition beams U1, U2 into a first partial beam T1, which propagates in the first beam channel 10, and a second partial beam T2, which propagates in the second beam channel 11. A combination element 13 is used for the coherent superposition of the two partial beams T1, T2 to form the output beam 6. A first reflector 14 is arranged in the first beam channel 10 and deflects the first partial beam T1 by 90° in relation to the combination element 13. Accordingly, a second reflector 15 is arranged in the second beam channel 11 and deflects the second partial beam T2 by 90° in relation to the combination element 13.

In the case of the superposition device 5 shown in FIG. 1*a*, the splitting element 12 and the combination element 13 are in the form of a (non-polarizing) 50% intensity beam splitter. The Mach-Zehnder interferometer 7*c* in FIG. 1*a* has a polarization-influencing device in the form of a polarization-rotating optical element, which is an optical rotator 16 in the form of an appropriately aligned quartz crystal. The optical rotator 16 causes a polarization direction R2 of the second partial beam T2 to rotate by 90°, with the result that the polarization direction R2 of the second partial beam T2, after passing through the optical rotator 16, is aligned parallel to the polarization direction R1 of the first partial beam T1. It goes without saying that such a parallel alignment of the two partial beams T1, T2 may also be achieved if, instead of a single optical rotator 16, two or more optical rotators are arranged in the respective beam channels 10, 11, these rotators causing appropriate rotation of the respective polarization directions R1, R2 of the two partial beams T1, T2.

In the case of the superposition device 5 shown in FIG. 1*a*, the first and the second combination device K1, K2 for coherent superposition each have an intensity beam splitter 8*a*, 8*b*. For the coherent superposition in the superposition device of FIG. 1*a*, the first input beam 1 and the second input beam 2 are fed with circular polarization, that is to say with a circular polarization state, to the first combination device K1. Accordingly, the third input beam 3 and the fourth input beam 4 are fed with circular polarization to the second combination device K2. A direction of rotation D1 of the circular polarization state of the first and the second input beam 1, 2 is opposite to a direction of rotation D2 of the circular polarization state of the third and the fourth input beam 3, 4.

Setting the relative phase position $\Delta\varphi_{12}$ between the first input beam 1 and the second input beam 2 makes it possible, upon coherent superposition in the intensity beam splitter 8*a* of the first combination device K1, to set the value for the power of the first superposition beam U1 between 0% and 100% of the sum of the powers $P_1$, $P_2$ of the first and the second input beam 1, 2. Correspondingly, setting the relative phase position $\Delta\varphi_{34}$ between the third input beam 3 and the fourth input beam 4 makes it possible, upon coherent superposition in the intensity beam splitter 8*b* of the second combination device K2, to set the value for the power of the second superposition beam U2 between 0% and 100% of the sum of the powers $P_3$, $P_4$ of the third and the fourth input beam 3, 4. It is thereby possible to set the power $P_A$ or the intensity of the output beam 6 using the first and the second combination device K1, K2.

In the example shown in FIG. 1*a*, the polarization direction R of the output beam 6 is set by setting or predefining the phase position $\Delta\varphi_{12,34}$ between the two pairs of input beams 1,2 and 3,4: Upon coherent superposition at the splitter element 12 of the Mach-Zehnder interferometer 7*c* of the third combination device K3, the two oppositely circularly polarized superposition beams U1, U2 are used to form the two linearly polarized partial beams T1, T2 described above, the polarization directions R1, R2 of which were initially rotated by 90° in relation to one another but are aligned parallel to one another using the optical rotator 16, with the result that the linearly polarized output beam 6 is generated with the desired polarization direction R, which can be set independently of the power $P_A$.

The superposition device 5 shown in FIG. 1*a* has three diagnostic outputs D, which form a respective second, inverted output of the first intensity beam splitter 8*a* of the first combination device K1, of the second intensity beam splitter 8*b* of the second combination device K2, and of the combination element 13 of the third combination device K3. Three diagnostic beams, which can be used to ascertain and monitor the polarization state or the polarization direction R and the power $P_A$ of the output beam 6 or of a respective superposition beam U1, U2, arise at the three diagnostic outputs D.

This is possible because the sum of the power of the diagnostic beam at the diagnostic output D and the power at the output A of the third combination device K3 is constant and independent of the relative phase positions $\Delta\varphi_{12}$; $\Delta\varphi_{34}$; $\Delta\varphi_{12,34}$. The polarization direction of the diagnostic beam is moreover perpendicular to the polarization direction R of the output beam 6. Therefore, the actual value for the polarization direction R and the actual value for the power $P_A$ of the output beam 6 can be measured indirectly at the diagnostic output D. This measurement can be used to adjust or regulate the respective power $P_1$ to $P_4$ and the respective phase positions $\Delta\varphi_{12}$; $\Delta\varphi^{34}$; $\Delta\varphi_{12,34}$ of the input beams 1 to 4 in order to set the setpoint value for the polarization direction R or the power $P_A$ of the output beam 6. To that end, it is also possible to act on the optical rotator 16 or on other optical components of the superposition device 5 that can have a settable design for this. Regulation using the diagnostic outputs D, however, typically runs on a longer timescale than the highly dynamic setting of the relative phase positions $\Delta\varphi_{12}$; $\Delta\varphi_{34}$; $\Delta\varphi_{12,34}$ of the input beams 1 to 4 does.

Since the diagnostic beam exiting at the diagnostic output D is inverted in relation to the output beam 6, it can be used not only for diagnostic purposes but also as further output beam, which is used in an application like the output beam 6. For example, in the case of an application consisting in voxel writing for optical data storage in the volume of transparent materials, the diagnostic output D or the diagnostic beam can be used for the parallel writing of "inverted" voxels that can be utilized to improve data security and to correct errors when the data are being read out. The same also applies to the diagnostic outputs D of the superposition devices 5 described below.

FIG. 1*b* shows a superposition device 5 which differs from the superposition device 5 shown in FIG. 1*a* in that the first combination device K1 and the second combination device K2 have a polarization beam splitter 9*a* and 9*b*, respectively, instead of the intensity beam splitters 8*a*,*b* shown in FIG. 1*a*. The splitting element 12 and the combination element 13 of the Mach-Zehnder interferometer 7*c* are also in the form of polarization beam splitters in the example shown in FIG. 1*b*. The polarization beam splitters 9*a*,*b*, 12, 13 are characterized in FIG. 1*b* and in the following figures by a dot and a double-headed arrow (s/p polarization) in order to distinguish them from the intensity beam splitters.

The superposition device 5 shown in FIG. 1*b* also differs from the superposition device shown in FIG. 1*a* in that the interferometer 7*c* has two polarization-influencing devices in the form of two polarization-rotating optical rotators 16*a*,*b*, which are designed to rotate a polarization direction R1, R2 of a respective one of the two partial beams T1, T2 by 45° and are arranged in the first beam channel 10 and in the second beam channel 11, respectively.

The superposition device 5 shown in FIG. 1*b* moreover differs from the superposition device shown in FIG. 1*a* in that a respective further polarization-rotating optical element 17$a$,$b$ for rotating the polarization direction of the first superposition beam U1 by 45° and for rotating the polarization direction of the second superposition beam U2 by 45° is arranged downstream of a respective polarization beam splitter 9$a$,$b$ of the first and the second combination device K1, K2, respectively, in the beam path.

As can be seen in FIG. 1$b$, the first and the second input beam 1, 2 that are fed to the first combination device K1 are linearly polarized and their polarization directions are aligned perpendicularly in relation to one another. Correspondingly, the third and the fourth input beam 3, 4 that are fed to the second combination device K2 are also linearly polarized and their polarization directions are aligned perpendicularly in relation to one another. As indicated in FIG. 1$b$, in the general case, the first and the second input beam 1, 2 are used to form a first, elliptically polarized superposition beam U1, the polarization direction (long half-axis of the elliptical polarization) of which is rotated by 45° using the further optical rotator 17$a$ of the first combination device K1, and the third and the fourth input beam 3, 4 are used to form a second, elliptically polarized superposition beam U2, the polarization direction of which is rotated by 45° using the further optical rotator 17$b$ of the second combination device K2.

The superposition device 5 shown in FIG. 1$b$, in a similar way to the superposition device 5 shown in FIG. 1$a$, makes it possible to independently set the power $P_A$ and the polarization direction R of the output beam 6. As can be seen in FIG. 1$b$, the superposition device 5 has only a single "inverting" diagnostic output D at the third combination device K3.

As a departure from the illustration in FIG. 1$b$, the further optical rotators 17$a$,$b$ in the first and the second combination device 17$a$,$b$ can be dispensed with if the preferred axes of the polarization beam splitter 9$a$,$b$ in the first and the second combination device K1, K2 are rotated by 45° in relation to one another relative to the preferred axes of the splitting element 12 and combination element 13, which are in the form of a polarization beam splitter, of the third combination device K3.

FIG. 1$c$ shows a superposition device 5 which differs from the superposition device 5 shown in FIG. 1$b$ in that it is not the third combination device K3 but the first and the second combination device K1, K2 that are in the form of a Mach-Zehnder interferometer 7$a$,$b$. In the example shown in FIG. 1$c$, a respective further optical rotator 17$a$,$b$, which cause rotation of the respective polarization direction by 45°, are arranged upstream of the splitting element 12 of the interferometer 7$a$ of the first combination device K1 in the beam path of the first and the second input beam 1, 2. Accordingly, a respective further optical rotator 17$c$,$d$, which cause rotation of the polarization direction by 45°, are arranged upstream of the splitting element 12 of the interferometer 7$b$ of the second combination device K2 in the beam path of the third and the fourth input beam 3, 4. The superposition beams U1, U2 formed in the first and the second combination device K1, K2 are coherently superposed in a third combination device K3, which is in the form of an intensity beam splitter 8$c$. The polarization directions of the four input beams 1 to 4 in FIG. 1$c$ correspond to the polarization directions of the four input beams 1 to 4 in FIG. 1$b$.

As described above, using the superposition devices 5 described in FIGS. 1$a$-$c$, in the case of which at least one of the combination devices K1 to K3 comprises a respective interferometer 7$a$-$c$, it is possible to set the polarization direction R and the power $P_A$ of the output beam 6 independently of one another solely by setting the relative phase positions $\Delta\varphi_{12}$; $\Delta\varphi_{34}$; $\Delta\varphi_{12,34}$. The superposition devices 5 shown in FIGS. 1$a$-$c$ may also be implemented using interferometers which are not Mach-Zehnder interferometers 7$a$-$c$.

In the case of the superposition device 5 shown in FIG. 1$a$, only intensity beam splitters 8$a$,$b$, 12, 13 are used; in the case of the superposition device 5 shown in FIG. 1$b$, only polarization beam splitters 9$a$,$b$, 12, 13 are used. However, it goes without saying that combinations of polarization and intensity beam splitters can also be used, as is the case for example for the superposition device 5 in FIG. 1$c$. The superposition devices 5 shown in FIGS. 1$a$-$c$ can fundamentally be scaled and cascaded from a design perspective and are flexible in terms of the sequence of the interferometers 7$a$,$b$,$c$ and the other superposition components.

FIGS. 2$a$-$d$ show examples of superposition devices 5, which likewise make it possible to independently set the polarization direction R and the power $P_A$ of the output beam 6 and in the case of which it is likewise possible to generate maximum constructive interference of the four input beams 1 to 4. In the case of the superposition devices 5 shown in FIGS. 2$a$-$d$, no interferometer 7$a$-$c$ is needed for this, by contrast to the example shown in FIGS. 1$a$-$c$.

The superposition devices 5 shown in FIGS. 2$a$-$d$ have the shared feature that the first, the second and the third combination device K1, K2, K3 each have either an intensity beam splitter 8$a$-$c$ or a polarization beam splitter 9$a$-$c$ for the coherent superposition of the first and the second input beam 1, 2, of the third and the fourth input beam 3, 4, and of the first and the second superposition beam U1, U2. For the coherent superposition, it is usually desired for at least one combination device K1, K2, K3 to have a polarization beam splitter 9$a$-$c$. In the case of the superposition device 5 shown in FIG. 2$a$, the third combination device K3 has a polarization beam splitter 9$c$, and in the case of the superposition devices 5 shown in FIGS. 2$b$-$d$, the first and the second combination device K1, K2 each have a polarization beam splitter 9$a$, 9$b$. In the case of the combination devices K1 to K3 of the superposition devices 5 shown in FIGS. 2$a$-$d$, splitting into two partial beams T1, T2, as is the case for the interferometers 7$a$-$c$ of FIGS. 1$a$-$c$, does not take place.

The superposition devices 5 shown in FIGS. 2$a$-$d$ moreover have the shared feature that at least one of the first, the second and the third combination device K1, K2, K3 has a phase shifting element, which is in the form of a $\lambda/4$ retardation device 20$a$-$c$ in the examples shown and is arranged downstream of the intensity beam splitter 8$a$-$c$ or the polarization beam splitter 9$a$-$c$ of the respective combination device K1 to K3, for the generation of linear polarization of the first superposition beam U1, the second superposition beam U2, and the output beam 6, respectively. The $\lambda/4$ retardation device 20$a$-$c$ makes it possible to rotate the polarization direction R1, R2, R of the first superposition beam U1, of the second superposition beam U2 and of the output beam 6, which were formed during the coherent superposition, by setting a phase difference $\Delta\varphi_{12}$; $\Delta\varphi_{34}$; $\Delta\varphi_{12,34}$ between the first and the second input beam 1, 2, the third and the fourth input beam 3, 4, and the first and the second super position beam U1, U2. In combination with the respective other stage of the two-stage superposition, the result is additional settability of the power $P_A$ of the output beam 6.

In the case of the superposition devices 5 shown in FIGS. 2$a$-$d$, the entering beams, each with an identical polarization state, in FIGS. 2$a$-$c$ with an identical polarization direction, are fed to a respective intensity beam splitter 8*a-c* of the first, the second and the third combination device K1, K2, K3, respectively.

Figure 2A:
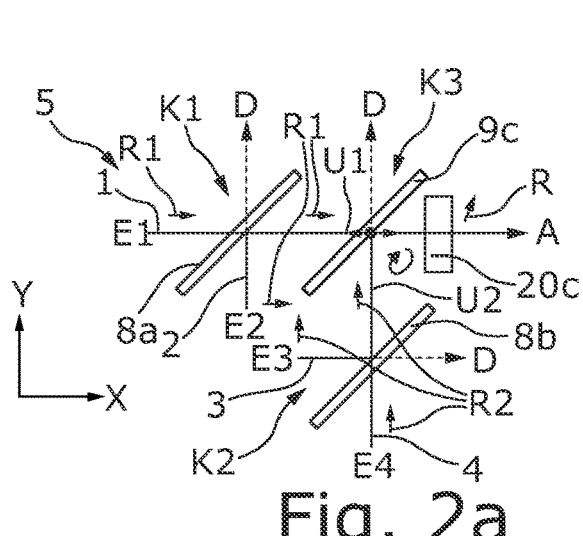
FIG. 2a, FIG. 2b, FIG. 2c and FIG. 2d show schematic illustrations of four superposition devices, similarly to FIGS. 1a-c, in the case of which at least one combination device comprises a λ/4 retardation device, which is arranged downstream of an intensity beam splitter or a polarization beam splitter in the beam path, according to some embodiments.

In the case of the superposition device 5 shown in FIG. 2*a*, the first and the second input beam 1, 2, which are coherently superposed in the intensity beam splitter 8*a* of the first combination device K1, each have linear polarization with a identical polarization direction. Correspondingly, the third and the fourth input beam 3, 4 of the second combination device K2 of the superposition device 5 of FIG. 2*a* each also have a linear polarization state with an identical polarization direction. In the case of the superposition device 5 shown in FIG. 2*c*, the two superposition beams U1, U2, which fed to the intensity beam splitter 8*c* of the third combination device K3, each have a linear polarization state with the same polarization direction. In the case of the superposition device 5 shown in FIG. 2*d*, the first and the second superposition beam U1, U2 are fed to the third combination device K3 each with a respectively identical elliptical polarization state.

If a respective combination device K1 to K3 has a polarization beam splitter 9*a-c* for coherent superposition, the polarization directions R1, R2 of the beams entering it in the case of the examples shown in FIGS. 2*a-d* are aligned perpendicularly in relation to one another. For the superposition devices 5 shown in FIG. 2*a,b*, in the case of which the third combination device K3 for coherent superposition has a polarization beam splitter 9*c*, the polarization directions R1, R2 of the first and the second superposition beam U1, U2 are aligned perpendicularly in relation to one another. The same applies to the superposition device 5 illustrated in FIG. 2*b*. This is desired in order to generate a power $P_A$ of the output beam 6 of 100% or 0% of the sum of the powers $P_1$ to $P_4$ of the input beams 1 to 4, that is to say in order to maximize the interference, so as to be able to set complete constructive interference or complete destructive interference, respectively. If the superposition device 5 is not intended to generate maximum or minimum constructive interference, it is possible, where appropriate, to deviate from a perpendicular alignment of the polarization directions R1, R2. Similarly, in the case of the superposition devices 5 shown in FIGS. 2*b-d*, the polarization directions R1, R2 of the first and the second input beam 1, 2 and of the third and the fourth input beam 3, 4, respectively, which enter the respective polarization beam splitter 9*a, b* of the first and the second combination device K1, K2, respectively, are each aligned perpendicularly in relation to one another. The polarizer axes of the polarization beam splitters 9*a-c* of the combination devices K1, K2, K3 of the superposition devices 5 of FIGS. 2*a-d* are each aligned parallel to the polarization directions R1, R2 of the respective input beams 1 to 4.

In the case of the superposition device 5 shown in FIG. 2*a*, the first combination device K1 can be used to set the power of the first superposition beam U1 by setting the relative phase position $\Delta\varphi_{12}$ between the first input beam 1 and the second input beam 2 between 0% and 100% of the sum of the powers $P_1$, $P_2$ of the two input beams 1, 2. The same applies for the second superposition beam U2, the power of which is set on the basis of the relative phase position $\Delta\varphi_{34}$ between the third and the fourth input beam 3, 4. The relative phase position $\Delta\varphi_{12}$ between the first and the second input beam 1, 2 and the relative phase position $\Delta\varphi_{34}$ between the third and the fourth input beam 3, 4 are preferably selected to have the same magnitude, with the result that the two superposition beams U1, U2 are incident on the polarization beam splitter 9*c* of the third combination device K3 with the same power.

Setting the relative phase position $\Delta\varphi_{12,34}$ between the first superposition beam U1 and the second superposition beam U2 sets the ellipticity, more specifically the aspect ratio between the two half-axes of the elliptical polarization at the output of the polarization beam splitter 9*c* of the third combination device K3. Owing to the parallel alignment of the polarizer axes of the polarization beam splitter 9*c* in relation to the polarization directions R1, R2 of the two superposition beams U1, U2, elliptical polarization, the half-axes of which are aligned at 45° in relation to the polarization directions R1, R2 of the two superposition beams U1, U2, is generated upon coherent superposition in the polarization beam splitter 9*c* of the third combination device K3. The λ/4 retardation device 20*c*, which follows in the beam path, in the example shown is in the form of a λ/4 plate and the preferred direction of which is aligned parallel to the preferred direction of the elliptical polarization (that is to say at 45° in relation to the polarizer axes or the polarization directions R1, R2 in the example shown in FIG. 2*b*), converts the elliptical polarization to linear polarization of the output beam 6. The polarization direction R of the output beam 6 depends on the aspect ratio of the elliptical polarization and can therefore be set by setting the relative phase position $\Delta\varphi_{12,34}$.

Figure 2B:
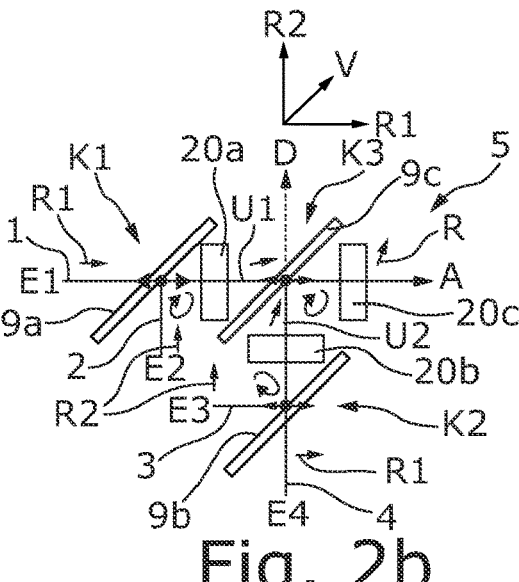

In the case of the superposition device 5 shown in FIG. 2*b*, the first and the second combination device K1, K2, instead of an intensity beam splitter 8*a,b*, each have a polarization beam splitter 9*a,b*, downstream of which is a λ/4 retardation device 20*a,b* in the form of a λ/4 plate. The functioning of the first and the second combination device K1, K2 corresponds to that of the third combination device K3 of FIG. 2*a*: A superposition beam U1, which is initially in an elliptically polarized state before it is linearly polarized at the λ/4 retardation device 20*a* of the first combination device K1, is formed from the first and the second input beam 1, 2. The same applies with respect to the third and the fourth input beam 3, 4, from which the second superposition beam U2 is formed in the second combination device K2. Setting the relative phase position $\Delta\varphi_{12}$ of the first and the second input beam 1, 2 and the relative phase position $\Delta\varphi_{34}$ of the third and the fourth input beam 3, 4 therefore makes it possible to set the respective linear polarization direction R1, R2 of the first and the second superposition beam U1, U2. The alignment of the polarization directions R1, R2 of the superposition beams U1, U2 relative to the preferred axis V of the polarization beam splitter 9*c* of the third combination device K3 makes it possible to set the splitting of the power of the superposition beams U1, U2 into the output A and the diagnostic output D, and thus the power $P_A$ of the output beam 6.

As a departure from the illustration shown in FIG. 2*b*, the two λ/4 retardation devices 20*a,b* can be dispensed with if the polarizer axis V of the polarization beam splitter 9*c* of the third combination device K3 is aligned at an angle of 45° in relation to the first and the second polarization direction R1, R2, as indicated in FIG. 2*b*. In FIG. 2*b*, it is also possible, instead of the λ/4 retardation devices 20*a,b*, to use optical rotators which rotate the polarization direction of the two superposition beams U1, U2 by 45° and therefore generate the same effect as the rotation of the polarization axis V of the polarization beam splitter 9*c* of the third combination device K3 by 45° in relation to the first and the second polarization direction R1, R2. In this case, the polarizer axes of the polarization beam splitter 9*c* of the third combination device K3 are aligned parallel to the first and the second polarization direction R1, R2. In all the cases described here, the preferred directions of the polarization of the superposition beams U1, U2 are aligned parallel to the polarizer axes of the polarization beam splitter 9c of the third combination device K3, since otherwise some of the power of the superposition beams U1 U2 is fed to the diagnostic output D and cannot be introduced into the output beam 6.

The polarization directions R1, R2 of the two superposition beams U1, U2 are preferably selected here such that they introduce the same proportions of power into the output beam 6. In this way, like in the case of the superposition device 5 of FIG. 2b, elliptical polarization aligned at 45° in relation to the polarization directions R1, R2 of the two superposition beams U1, U2 is generated. The λ/4 retardation device 20c of the third combination device K3 is used to form a linear polarization state of the output beam 6 with a settable polarization direction R from the elliptical polarization state of the output beam 6.

Figure 2C:
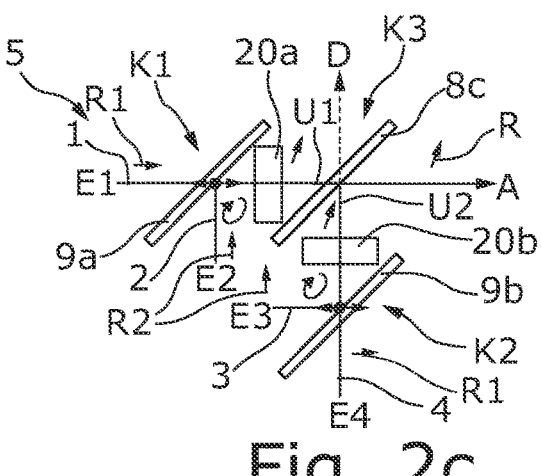

The superposition device 5 shown in FIG. 2c has a first and a second combination device K1, K2, which are designed like the superposition device 5 shown in FIG. 2b and make it possible to predefine the linear polarization direction R1, R2 of the first and the second superposition beam U1, U2, respectively, by setting the respective relative phase positions 412, 4 34 of the first and the second input beam 1, 2 and of the third and the fourth input beam 3, 4, respectively. In the case of the superposition device 5 shown in FIG. 2c, the relative phase positions 412, 434 are preferably set such that the two superposition beams U1, U2 have an identical polarization direction R1, R2. The power of the input beams 1 to 4 is set such that, without the superposition, the same powers are transferred to the output beam 6. Setting the relative phase position $\Delta\varphi_{12,34}$ between the two superposition beams U1, U2 makes it possible to set the power $P_A$ of the output beam 6 using the above-described intensity beam splitter 8c of the third combination device K3, specifically in a range of values between 0% and 100% of the sum of the powers $P_1$ to $P_4$ of the input beams 1 to 4.

Figure 2D:
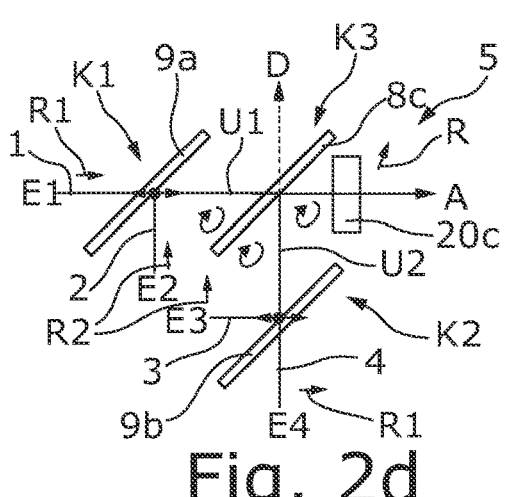

In the case of the superposition device 5 illustrated in FIG. 2d, the first and the second combination device K1, K2 for coherent superposition each have a polarization beam splitter 9a,b, which generate a first and a second elliptically polarized superposition beam U1, U2. In the case of the identical powers $P_1$ to $P_4$ prescribed here of the four input beams 1 to 4, the result is elliptical polarization with principal axes aligned at 45° in relation to the one or more polarizer axes V and in relation to the two polarization directions R1, R2 of the respective input beams 1,2 and 3,4. In the event of variation of the relative phase positions $\Delta\varphi_{12}$; $\Delta\varphi_{34}$, the extreme values can run from circular polarization to linear polarization in this respect. Moreover, it is possible to set the power which is input coupled into the first superposition beam U1 and into the second superposition beam U2. Preferably, the two relative phase positions $\Delta\varphi_{12}$; $\Delta\varphi_{34}$ are selected to have the same magnitude, in order to feed the two superposition beams U1, U2 to the intensity beam splitter 8c of the third combination device with substantially the same power. The polarization, more specifically the elliptical polarization state of the two superposition beams U1, U2, is likewise set as identical in this way. In this way, upon superposition of the two superposition beams U1, U2 by a λ/4 retardation device 20c arranged downstream of the intensity beam splitter 8c of the third combination device K3, a linearly polarized output beam 6 with a settable polarization direction R is generated.

In the case of the superposition devices 5 shown in FIGS. 2a-d, the three combination devices K1, K2, K3 for the coherent superposition each have either an intensity beam splitter 8a-c or a polarization beam splitter 9a-c in the form of separate optical components. However, this is not necessarily the case, it being possible instead to use two or more combination devices K1, K2, K3 of one or more shared optical components for the coherent superposition.

Figure 3A:
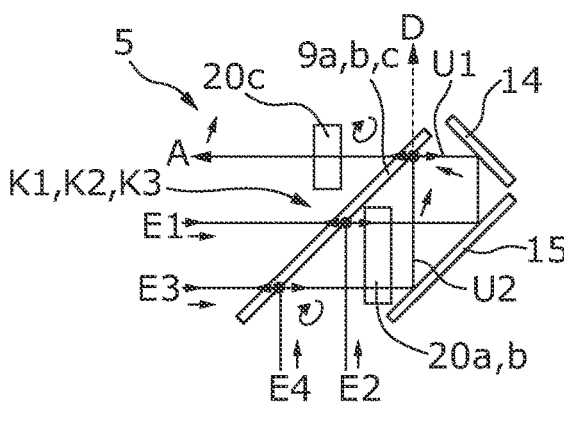
FIG. 3a and FIG. 3b show schematic illustrations of superposition devices, similarly to FIG. 2b and FIG. 2d, respectively, in the case of which a shared polarization beam splitter is used for two and for all three combination devices, respectively, according to some embodiments.

FIG. 3a shows a superposition device 5, the functioning of which corresponds to that of the superposition device 5 shown in FIG. 2b and in the case of which the three polarization beam splitters 9a-c are combined in a single optical component in the form of a shared polarization beam splitter. The first and the second input beams 1, 2, the third and the fourth input beams 3, 4 and the two superposition beams U1, U2 are superposed at different positions along the shared polarization beam splitter 9a,b,c here. The two λ/4 retardation devices 20a,b of the first and the second combination device K1, K2 of the superposition device 5 of FIG. 2b are likewise in the form of a shared λ/4 retardation plate 20a,b. Two deflection mirrors 14, 15 serve to deflect the first and the second superposition beam U1, U2 to the shared polarization beam splitter 9a,b,c for coherent superposition to form the output beam 6.

Figure 3B:
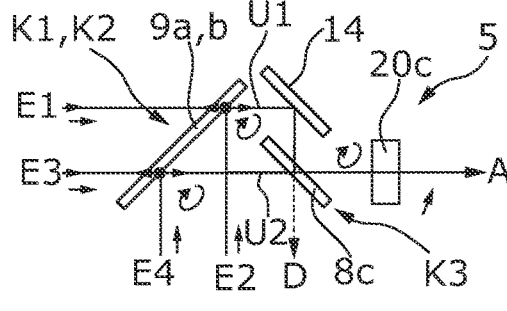

The superposition device 5 shown in FIG. 3b corresponds in terms of its functioning to the superposition device 5 shown in FIG. 2d, but the first and the second combination device K1, K2 are in the form of a shared polarization beam splitter 9a,b. A deflection mirror 14 serves to deflect the first superposition beam U1 to the intensity beam splitter 8c, which together with the λ/4 retardation plate 20c forms the third combination device K3 of the superposition device 5.

The superposition devices 5 described above are designed for coherent superposition of four input beams 1 to 4 to form a coherently superposed output beam 6. The superposition device 5 may, however, also serve for superposition of multiple groups of four input beams to form a respective output beam assigned to the respective group.

Figures 4, 5A, 5B, 5C, 6:
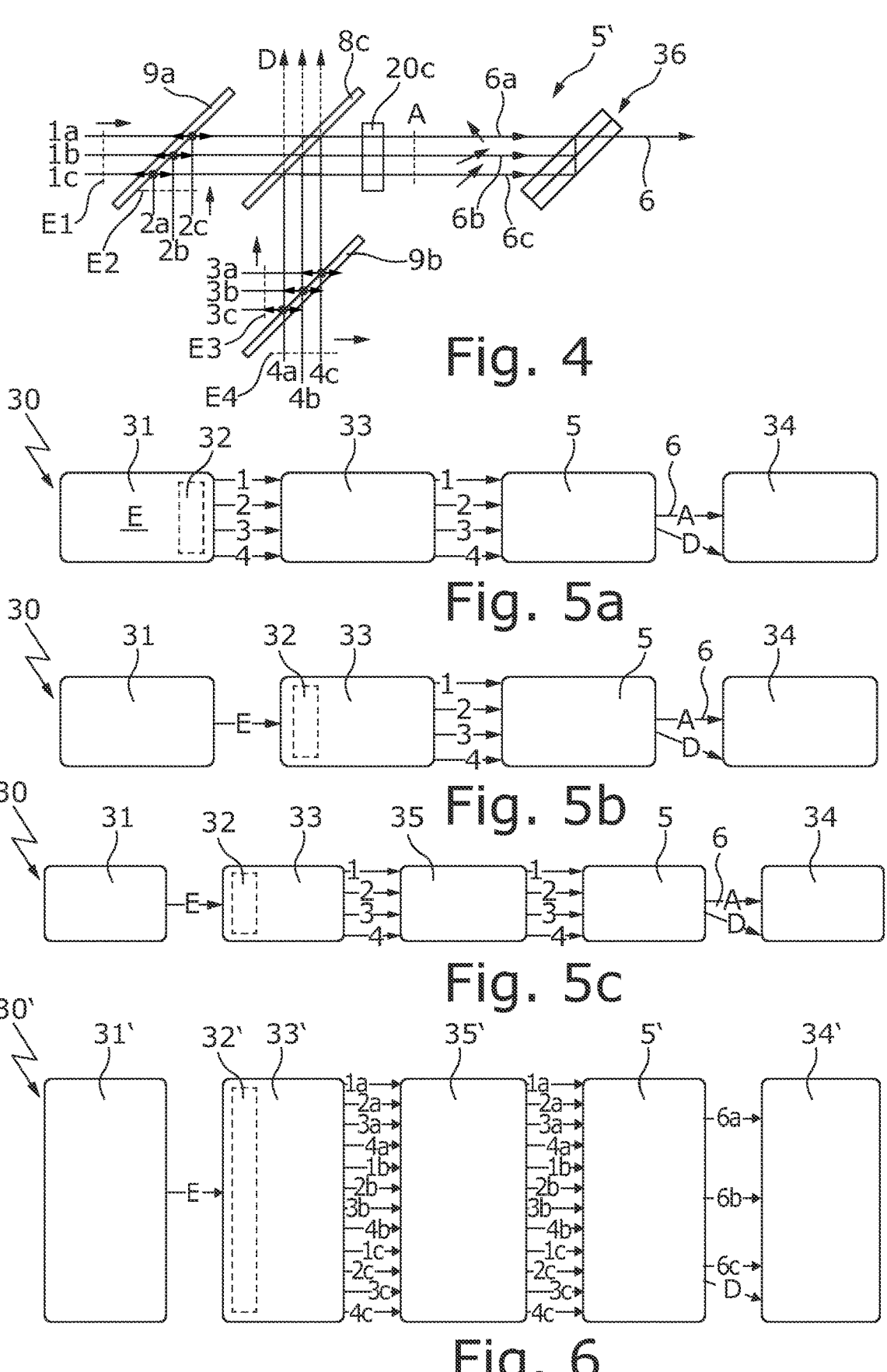
FIG. 4 shows a schematic illustration of a superposition device, similarly to FIG. 2d, which is designed to superpose three groups each of four mutually coherent input beams to form a respective coherent output beam, according to some embodiments.
FIG. 5a, FIG. 5b and FIG. 5c show schematic illustrations of optical systems comprising a superposition device according to FIGS. 1a-c, FIGS. 2a-d and FIGS. 3a,b, respectively, according to some embodiments.
FIG. 6 shows a schematic illustration of an optical system comprising a superposition device according to FIG. 4, according to some embodiments.

FIG. 4 shows such a superposition device 5' by way of example, which is designed for coherent superposition of three groups, each of four input beams 1a-c, 2a-c, 3a-c, 4a-c, to form a respective shared output beam 6a-c. As in the examples shown in FIG. 3a,b, this is achieved in that the two polarization beam splitters 9a, 9b are large enough to enable the coherent superposition of the first and second input beams 1a-c, 2a-c and of the third and fourth input beams 3a-c, 4a-c, respectively, at different, laterally offset positions. The superposition beams respectively formed here are correspondingly coherently superposed at different, laterally offset positions of a shared intensity beam splitter 8c. In this way, it is possible to set both the linear polarization states, indicated in FIG. 4, of the three output beams 6a-c and their powers independently of one another. It goes without saying that it is possible to coherently superpose not only three groups of input beams 1a-c, 2a-c, 3a-c, 4a-c but also a higher or lower number of groups of input beams using a suitably designed superposition device 5'.

FIGS. 5a-c show an optical system 30 having a beam source 31 for generating a laser beam E and a splitting device 32 for splitting the laser beam E (more precisely, the power of the laser beam E) in equal parts into the four mutually coherent input beams 1 to 4, such that the four input beams 1 to 4 have identical powers $P_1$ to $P_4$ following the split. The optical system 30 also comprises a phase modulation device 33, which is designed to rapidly modulate the relative phase positions $\Delta\varphi_{1,2}$, $\Delta\varphi_{2,3}$, $\Delta\varphi_{12,34}$ (cf. FIG. 1a) of the four input beams 1 to 4. The superposition device 5, which coherently superposes the four input beams 1 to 4 and forms the output beam 6, is arranged downstream of the phase modulation device 33 in the beam path. The superposition device 5 may be designed for example as illustrated in FIGS. 1*a-c*, FIGS. 2*a-d* or FIG. 3*a,b*.

The optical system 30 also has an application device 34 which, in the example shown, is a processing device in the form of a processing head that serves to process a workpiece using the output beam 6. To position the output beam 6 or multiple output beams 6*a-c* (see below) relative to the workpiece, the application device 34 may have translational movement units for moving the processing head and/or the workpiece. The application device may also have a scanner device for dynamic beam positioning (2 D, 2.5 D) and/or be designed to perform spatio-temporal beamforming, position detection (prior to the process) and/or process control (in-situ, ex-situ).

In the case of the optical system 30 shown in FIG. 5*a*, the splitting device 32 is arranged in the beam source 31 and the beam source 31 input couples the four input beams 1 to 4 into the phase modulation device 33. In the case of the optical system 30 shown in FIG. 5*b*, the splitting device 32 is arranged in the phase modulation device 33 and the beam source 31 input couples the laser beam E into the phase modulation device 33. In the case of the optical system 30 shown in FIG. 5*c*, a conversion device 35 is arranged between the phase modulation device 33 and the superposition device 5. The conversion device 35 may perform one or more functions and be designed in various ways, as will be described in more detail below.

In the case of the example shown in FIG. 5*c*, the beam source 31 is a seed laser of a MOPA (Master Oscillator Power Amplifier) system. The conversion device 35 is in this case a power amplifier of the MOPA system, in which the four input beams 1 to 4 are amplified prior to being fed to the superposition device 5. In this case, the phase modulation device 33 is arranged upstream of the power amplifier or the conversion device 35 in the beam path. This is expedient since it is possible in this case, in the phase modulation device 33, to use optical components that do not have to have either high performance or high efficiency. By contrast, the average power and/or peak power of the output beam 6 is large in the case of an optical system 30 in the form of a MOPA system due to the use of the power amplifier. The conversion device 35 of the optical system 30 may however also be a different type of optical amplifier.

The beam source 31 may be designed to generate a cw laser beam and/or a pulsed laser beam E. The beam source 31 may for example generate an ultrashort pulse laser beam containing laser pulses whose pulse durations are of the order of ps or fs. In the case of ultrashort pulse lasers, use is often made of what is known as chirped pulse amplification (CPA), in which temporally stretched pulses are amplified and then compressed. CPA technology may be combined with the coherent coupling, as described here, of the four input beams 1 to 4 to form the output beam 6 in the superposition device 5. In this case, the conversion device 35 may for example form or include a pulse compressor of the CPA system. The conversion device 35 may, however, also generally be designed for pulse shaping of the input beams 1 to 4, which are pulsed in this case.

The conversion device 35 may also be used for frequency conversion of the four input beams 1 to 4. In this case, the coherent superposition in the superposition device 5 is combined with a frequency conversion that takes place in the conversion device 35, upstream of the combination device 5 in the beam path. The optical system 30, also in the form of a MOPA system, is compatible with a frequency conversion device arranged between the beam source 31 and the superposition device 5.

It goes without saying that the conversion device 35 may also be designed to perform several of the functions described above, or other functions. For example, the conversion device 35 may be used to set or adjust the beam parameters or pulse parameters needed for the respective application, such as pulse energy, pulse duration, etc. The conversion device 35 may also be used for beam transport or for flexible beam guidance. The optical system 30 may also have multiple conversion devices 35.

By way of example, a conversion device 35 may be integrated in the application device 34 and serve to influence the polarization of the output beam 6. By way of example, the application device 34 or the conversion device 35, in order to feed the output beam 6 to the workpiece, may have a birefringent component, for example an optical fiber, in particular a fiber-based amplifier. In this case, the superposition device 5 may perform preliminary compensation of the birefringence generated when the output beam 6 is fed to the workpiece. Typically, the preliminary compensation is performed by appropriately adjusting the relative phase positions $\Delta\varphi_{12}$; $\Delta\varphi_{34}$; $\Delta\varphi_{12,34}$ set by the phase modulation device 33, so as to achieve the desired combination of the polarization state or polarization direction R and the power $P_A$ of the output beam 6 at the workpiece. It is thereby possible to use non-polarization-preserving transport fibers in the optical system 30 as well or to modify the MOPA concept by virtue of the superposition taking place upstream of the (typically fiber-based) power amplifier, which in this case is integrated in the application device 34.

The optical system 30' shown in FIG. 6 differs from the optical system 30 shown in FIGS. 5*a-c* in that three groups, each of four input beams 1*a* to 4*a*, 1*b* to 4*b*, 1*c* to 4*c* are fed to the superposition device 5', which is designed as illustrated in FIG. 4. The four input beams 1*a* to 4*a*, 1*b* to 4*b*, 1*c* to 4*c* of the respective group are coherently combined in the superposition device 5' to form a respective shared output beam 6*a-c*, which is fed to an application device 34'. The phase modulation device 33' and the splitting device 32' are adjusted to match the number of twelve input beams 1*a* to 4*a*, 1*b* to 4*b*, 1*c* to 4*c* in total. It goes without saying that it is not imperatively necessary for the beam source 31' in the example shown in FIG. 6 to generate a single input beam E which is split into the twelve input beams 1*a* to 4*a*, 1*b* to 4*b*, 1*c* to 4*c* in total, since only the four input beams 1*a* to 4*a*, 1*b* to 4*b*, 1*c* to 4*c* in a respective group need to be coherent in relation to one another.

The optical system 30' of FIG. 6 may therefore also have a beam source 31', which comprises three laser sources for generating a respective dedicated laser beam E for each group of input beams 1*a* to 4*a*, 1*b* to 4*b*, 1*c* to 4*c*. In this case, the phase modulation unit 33' is designed as described above and serves to set the relative phase positions for each group of four input beams 1*a* to 4*a*, 1*b* to 4*b*, 1*c* to 4*c* independently of one another. The conversion device 35 may also be designed to perform conversion for each of the three groups of input beams 1*a* to 4*a*, 1*b* to 4*b*, 1*c* to 4*c* independently of one another. This makes it possible in particular to combine different parameters in the three output beams 6*a-c* by, for example, operating the three laser sources of the beam source 31' with different parameters or by converting the three groups of input beams 1*a* to 4*a*, 1*b* to 4*b*, 1*c* to 4*c* in the conversion device 35 in a different way. The different parameters may relate to the power, the repetition frequency, the pulse duration, the wavelength or a temporal offset between the three groups of input beams 1a to 4a, 1b to 4b, 1c to 4c and the associated output beams 6a-c, respectively.

The three output beams 6a-c illustrated in FIG. 6 may also be spatially superposed or combined in a spatial combination device 36 of the superposition device 5', as indicated in FIG. 4. In the case of (optional) spatial combination, only a single output beam 6 is fed to the application device 34'. The output beams 6a-c may be superposed for example by wavelength multiplexing, if conversion into a respective different spectral distribution of the three groups of input beams 1a to 4a, 1b to 4b, 1c to 4c is performed in the conversion device 35 or if the beam source 31' is designed to generate three laser beams with different wavelengths that enable wavelength-selective deflection for the superposition in the spatial combination device 36. It goes without saying that, as an alternative to the three output beams 6a-c, it is also possible to spatially superpose the input beams 1a to 4a, 1b to 4b, 1c to 4c of a respective group in or upstream of the superposition device 5'.

The optical system 30, 30' described above may be used for example to write voxels to transparent materials for data storage. The optical system 30, 30' may also be used to produce optical components on the basis of spatially dependent polarization manipulation. The rapid polarization change generated by the optical system 30, 30' may also be used advantageously for other applications, for example for analytical methods.

It goes without saying that the functionalities implemented using the optical components or component parts of the optical system 30, 30' that are described above may also be implemented using differently designed optical components that provide the same functionality.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A superposition device for the coherent superposition of four mutually coherent input beams to form an output beam, the superposition device comprising:

four inputs, each respective input for entry of a respective one of the four input beams, an output for exit of the output beam, a first combination device for coherent combination of a first input beam and a second input beam of the four input beams to form a first superposition beam, a second combination device for coherent combination of a third input beam and a fourth input beam of the four input beams to form a second superposition beam, and a third combination device for forming the output beam by coherent combination of the first superposition beam and the second superposition beam, wherein the superposition device is configured to set both a polarization direction and a power of the output beam independently of one another based on relative phase positions of individual phases of the four input beams fed to the four inputs in relation to one another;

wherein each of the first combination device, the second combination device, and/or the third combination device comprises or forms an interferometer, with a first beam channel for propagation of a first partial beam and a second beam channel for propagation of a second partial beam.

2. The superposition device as claimed in claim 1, wherein the interferometer of the first combination device comprises:

a first splitting element for splitting the coherently superposed first input beam and second input beam into the first partial beam and the second partial beam, and a first combination element for coherent superposition of the first partial beam and the second partial beam to form the first superposition beam, and/or wherein the interferometer of the second combination device comprises:

a second splitting element for splitting the coherently superposed third input beam and fourth input beam into the first partial beam and the second partial beam, and a second combination element for the coherent superposition of the first partial beam and the second partial beam to form the second superposition beam.

3. The superposition device as claimed in claim 1, wherein the interferometer of the third combination device comprises a splitting element for splitting the first superposition beam and the second superposition beam into the first partial beam and the second partial beam, and a combination element for coherent superposition of the first partial beam and the second partial beam to form the output beam.

4. The superposition device as claimed in claim 1, wherein the interferometer comprises at least one polarization-influencing device for influencing a polarization direction of at least one of the first partial beam and the second partial beam in fixedly predefined fashion.

5. The superposition device as claimed in claim 4, wherein the interferometer comprises a splitting element and a combination element in a form of intensity beam splitters, and the interferometer comprises, as the polarization-influencing device, an optical rotator for aligning the polarization directions of the first partial beam and the second partial beam perpendicularly relative to one another.

6. The superposition device as claimed in claim 5, being configured to feed the first input beam and the second input beam, the third input beam and the fourth input beam, or the first superposition beam and the second superposition beam, with circular polarization and respective opposite directions of rotation, to the splitting element of the interferometer.

7. The superposition device as claimed in claim 4, wherein the interferometer comprises a splitting element and a combination element in a form of polarization beam splitters, and the interferometer comprises, as the polarization-influencing devices, two optical rotators for rotating a polarization direction of a respective one of the first partial beam and the second partial beam by 45°.

8. The superposition device as claimed in claim 7, further comprising: at least two polarization-rotating optical elements, arranged upstream of the splitting element of the interferometer in a beam path and configured to rotate a polarization direction of the first input beam and the second input beam, of the third input beam and the fourth input beam, or of the first superposition beam and the second superposition beam by 45°.

9. The superposition device as claimed in claim 1, wherein the first combination device for the coherent combination of the first input beam and the second input beam, the second combination device for the coherent combination of the third input beam and the fourth input beam, and/or the third combination device for the coherent combination of the first superposition beam and the second superposition beam have/has an intensity beam splitter or a polarization beam splitter.

10. The superposition device as claimed in claim 9, being configured to feed the first input beam and the second input beam, the third input beam and the fourth input beam, or the first superposition beam and the second superposition beam with a respective identical polarization direction, to the intensity beam splitter.

11. The superposition device as claimed in claim 9, being configured to feed the first input beam and the second input beam, the third input beam and the fourth input beam, or the first superposition beam and the second superposition beam, having two mutually perpendicular polarization directions, to the polarization beam splitter.

12. The superposition device as claimed in claim 9, wherein the first combination device is configured to rotate a polarization direction of the first superposition beam based on a relative phase position between the first linearly polarized input beam and the second linearly polarized input beam, and/or wherein the second combination device is configured to rotate a polarization direction of the second superposition beam based on a relative phase position between the third linearly polarized input beam and the fourth linearly polarized input beam, and/or wherein the third combination device is configured to rotate a polarization direction of the output laser beam, based on a relative phase position between the first superposition beam and the second superposition beam.

13. The superposition device as claimed in claim 9, wherein the first combination device, the second combination device, and/or the third combination device, in order to generate a linear polarization of the first superposition beam, of the second superposition beam, and/or of the output beam, comprises a phase shifting element, arranged downstream of the intensity beam splitter or the polarization beam splitter in a beam path.

14. The superposition device as claimed in claim 9, wherein the four inputs are configured for entry of at least four further input beams, and the output is configured for exit of at least one further output beam that is a coherent combination of the at least four further input beams.

15. An optical system comprising:

a beam source for generating a laser beam, a splitting device for splitting the laser beam into four mutually coherent input beams, a phase modulation device for modulating relative phase positions of the four input beams, and a superposition device as claimed in claim 1 for the coherent superposition of the four input beams to form the output beam.

16. The optical system as claimed in claim 15, wherein the splitting device is configured to split the laser beam or a further laser beam generated by the beam source into at least four further mutually coherent input beams, wherein the phase modulation device is configured to modulate relative phase positions of the at least four further input beams, and wherein the superposition device is configured for coherent superposition of the at least four further input beams to form at least one further output beam.

17. The optical system as claimed in claim 15, being configured to feed the four input beams to the four inputs of the superposition device with substantially a same power.

18. The optical system as claimed in claim 15, being configured to feed the four input beams to the four inputs of the superposition device with linear polarization having a predefined polarization direction or with circular polarization.

* * * * *